(12) United States Patent
Elio et al.

(10) Patent No.: US 6,375,263 B1
(45) Date of Patent: Apr. 23, 2002

(54) SELF-TIGHTENING MECHANISM

(75) Inventors: Paul A. Elio; Robert E. Glaspie, both of Phoenix; Hariharan K. Sankaranarayanan, Scottsdale, all of AZ (US)

(73) Assignee: Elio Engineering Inc., Phoenix, AZ (US)

( * ) Notice: Subject to any disclaimer, the term of this patent is extended or adjusted under 35 U.S.C. 154(b) by 0 days.

(21) Appl. No.: 09/588,136

(22) Filed: Jun. 2, 2000

Related U.S. Application Data
(60) Provisional application No. 60/137,852, filed on Jun. 7, 1999.

(51) Int. Cl.[7] .............................. B60N 2/02; B60N 2/24; B60N 2/30
(52) U.S. Cl. .................. 297/354.12; 297/374; 297/362; 297/44; 297/45; 297/361; 297/362.12; 297/375
(58) Field of Search ............................ 297/374, 354.12, 297/362, 361.1, 362.12, 375, 216.13, 216.14, 301.1; 192/44, 45

(56) References Cited

U.S. PATENT DOCUMENTS 3,926,474 A * 12/1975 Johndrow et al. .......... 297/367
4,705,318 A * 11/1987 Yamada et al. ............. 297/362

* cited by examiner

*Primary Examiner*—Carl D. Friedman
*Assistant Examiner*—Chris Nguyen
(74) *Attorney, Agent, or Firm*—Parsons & Goltry; Robert A. Parsons; Michael W. Goltry

(57) ABSTRACT

A self-tightening mechanism mounted on a seat having a back portion. The self-tightening mechanism including a drum coupled to the back portion, a band wrapped about the drum inhibiting rotation thereof and having a first end and a second end. A tightening mechanism coupled to the first end and the second end such that a force applied to the back portion in either of two opposing directions produces a tension in the band adjacent either one of the first end and the second end and a corresponding loosening of the band adjacent the other end. The tightening mechanism including a lever pivotable about a fixed pivot point to convert a portion of the tension to reduce the loosening.

14 Claims, 11 Drawing Sheets

SELF-TIGHTENING MECHANISM

CROSS-REFERENCE TO RELATED APPLICATION

This application claims the benefit of U.S. Provisional Application 60/137,852, filed Jun. 7, 1999.

BACKGROUND OF THE INVENTION

1. Field of the Invention

This invention relates to seating devices.

More particularly, the present invention relates to adjustment mechanisms for seating devices.

In a further and more specific aspect, the present invention concerns adjustment mechanisms for vehicle seating.

2. The Prior Art

Within the art of recliner mechanisms for vehicle seating, many and diverse devices have been developed. These devices often function satisfactorily for the actual reclining function, but function poorly in the area of safety. Typically, when a force of a specific magnitude, such as from a collision, is applied to a seat back, the seat has a catastrophic failure. In other words, the seat back remains more or less rigid and supportive until a certain level of force is exceeded. When this level is reached, the recliner mechanism breaks, letting the seat back pivot unrestrained. When this failure occurs, injury to the occupant of the seat can result. In many automobiles, the space allocated for a recliner mechanism is very limited. By reducing size and cost, often current recliner mechanisms are less than robust and fail at the application of relatively low forces. With the increase of restraint belts which attach to the seat back, forces applied to the seat back in a collision will only increase.

It would be highly advantageous, therefore, to remedy the foregoing and other deficiencies inherent in the prior art.

Accordingly, it is an object the present invention to provide a recliner mechanism which clutches under a specified load.

SUMMARY OF THE INVENTION

Briefly, to achieve the desired objects of the present invention in accordance with a preferred embodiment thereof, provided is a self-tightening mechanism including a back portion, a drum coupled to the back portion, a band and a tightening mechanism. The band includes a first end and a second end and is wrapped about the drum, inhibiting rotation thereof. The tightening mechanism is coupled to the first end and the second end such that a force applied to the back portion in either of two opposing directions produces a tension in the band adjacent either one of the first end and the second end and a corresponding loosening of the band adjacent the other of the first end and the second end. The tightening mechanism includes a lever pivotable about a fixed pivot point to convert a portion of the tension to reduce the loosening.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF THE PREFERRED EMBODIMENTS

Figure 1:
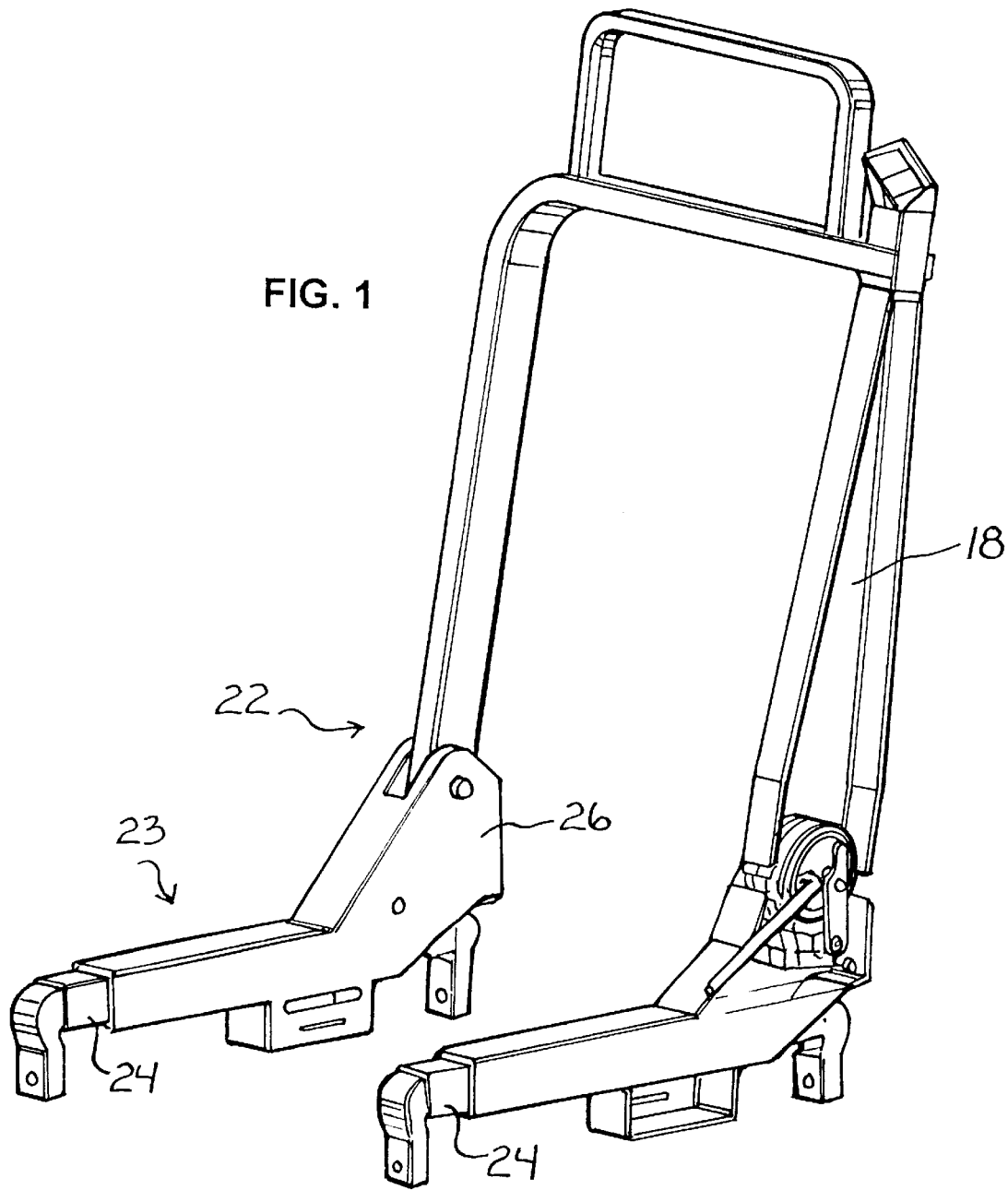
FIG. 1 is a perspective view of an embodiment of a seat frame incorporating a self tightening mechanism in accordance with the present invention.

The present invention provides new and improved apparatus that moves into a self tightening condition when a back portion is loaded with torque. Turning to FIG. 1, a seat frame 22 is illustrated. Seat frame 22 includes a back portion (reclining element) 18 and a bottom portion 23. Bottom portion 23 is adjustably mounted by a track mechanism 24 which will not be described in detail herein since it is not a portion of this invention. Back portion 18 is adjustably coupled to bottom portion 23 by a self tightening recliner mechanism 10. For specific details on the operation of track mechanism 24 and a recliner mechanism including the attachment of a drum 11 to seat frame 22, see co-pending U.S. patent application entitled "Adjustable Support Apparatus and Architecture for Adjusting Support Apparatus", Ser. No. 09/092,675, filed Jun. 5, 1998, incorporated herein by reference.

Figure 2:
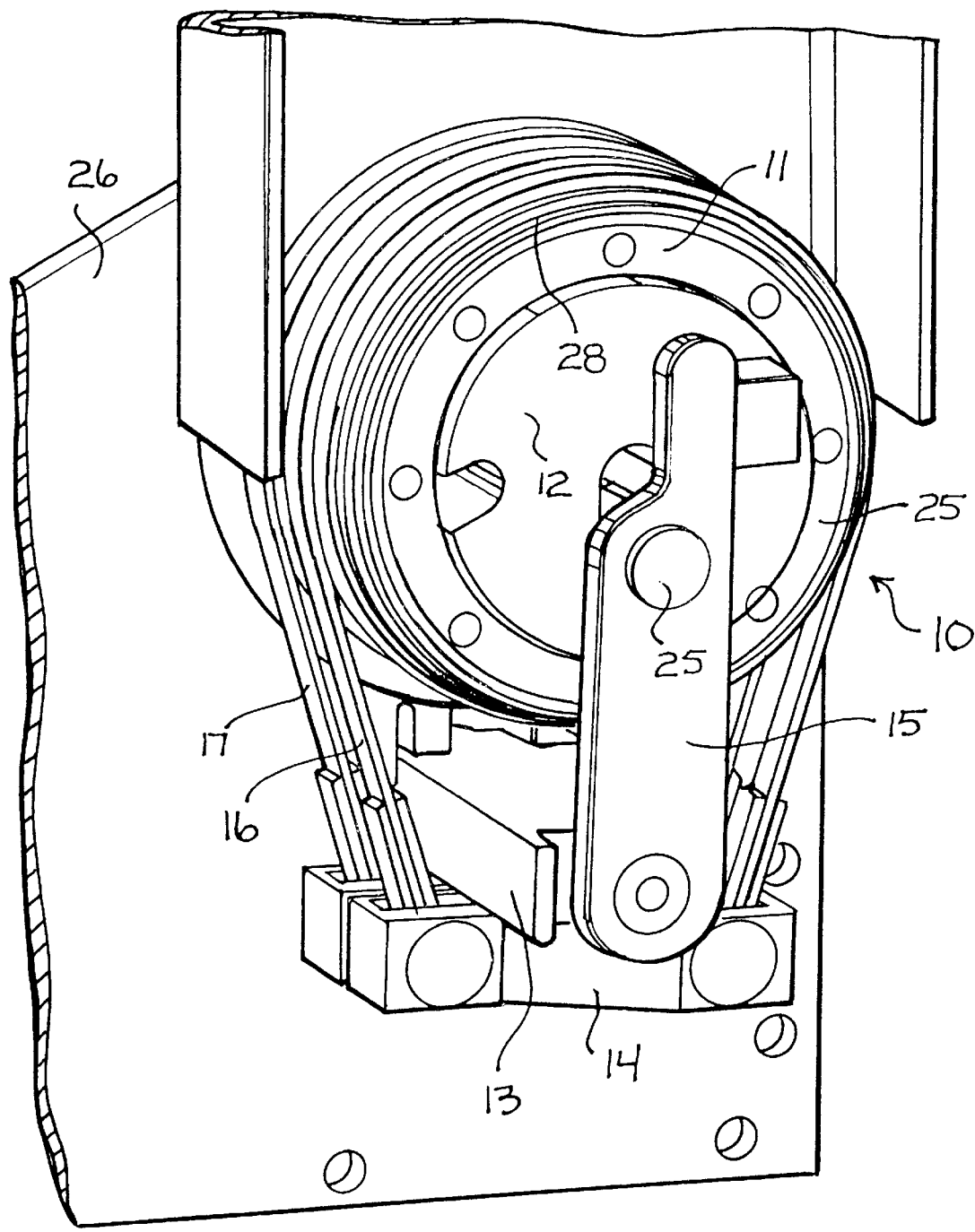
FIG. 2 is an enlarged perspective view of the self-tightening mechanism of FIG. 1.
Figure 3:
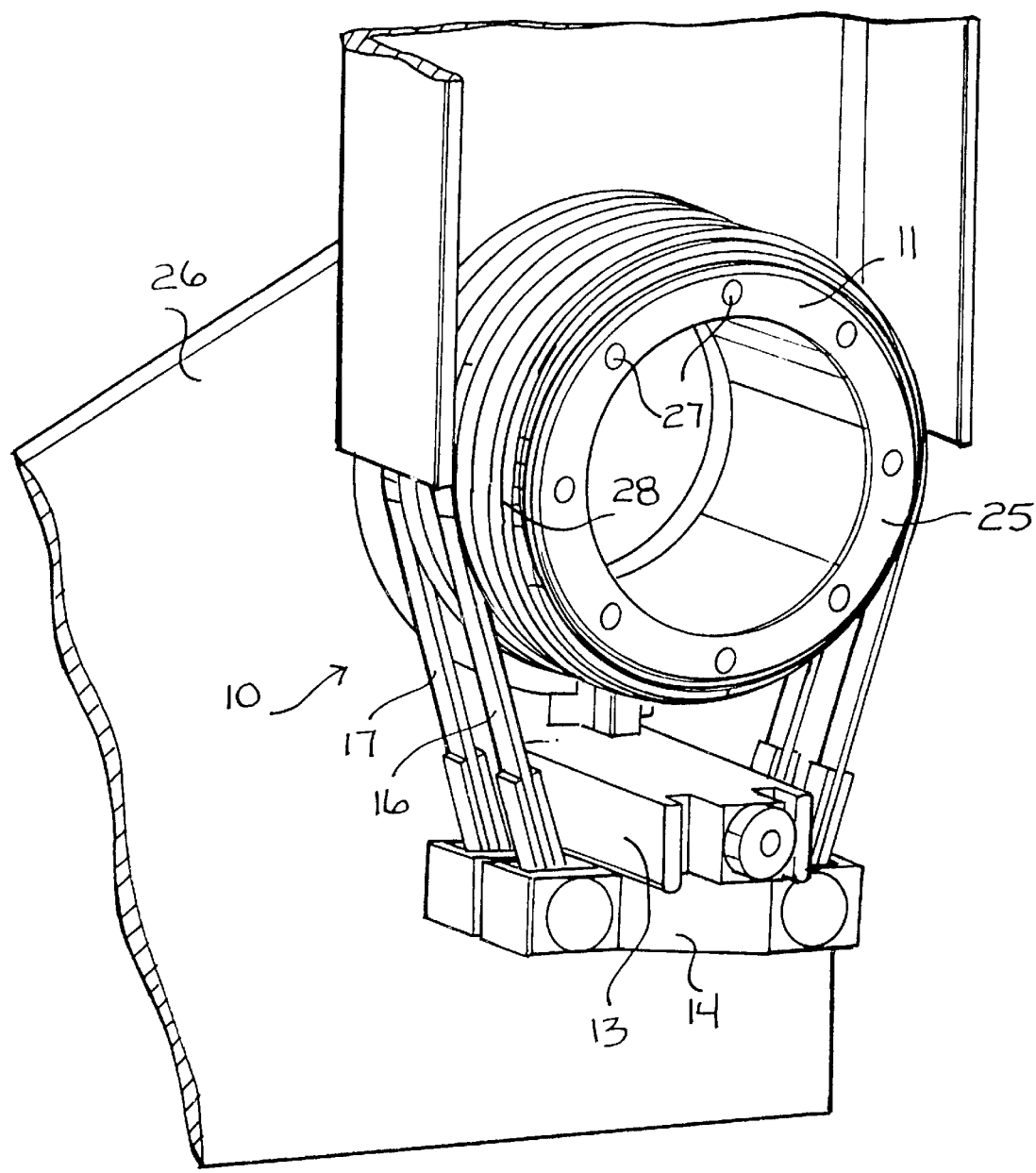
FIG. 3 is another perspective view of the self-tightening mechanism of FIG. 2.

Turning to FIG. 2, self-tightening mechanism 10 includes drum 11, a link 12 coaxially mounted for limited rotation within drum 11, a pivot block 13, a lever 14 and linkages 15 (only one shown) coupling (rigidly or pivotally) pivot block 13 to link 12. Pivot block 13 is fixed by linkage 15 between drum 11 and lever 14 and bears against lever 14. Linkages 15 are mounted on opposite ends of an axle 25. Axle 25 extends through a camming opening in link 12 which allows limited relative movement between drum 11 and pivot block 13 upon rotation of link 12. Regarding also FIG. 3, bands 16 and 17 having ends engaged (rigidly or pivotally) to lever 14 along either side of pivot block 13, engage drum 11 in a wrapped condition. Although two bands are shown, less or more may be used. It will also be understood that while bands 16 and 17 are illustrated as straps or cables, other bands such as coiled rods, etc., which can be loosened or tightened, can be used.

Figure 4:
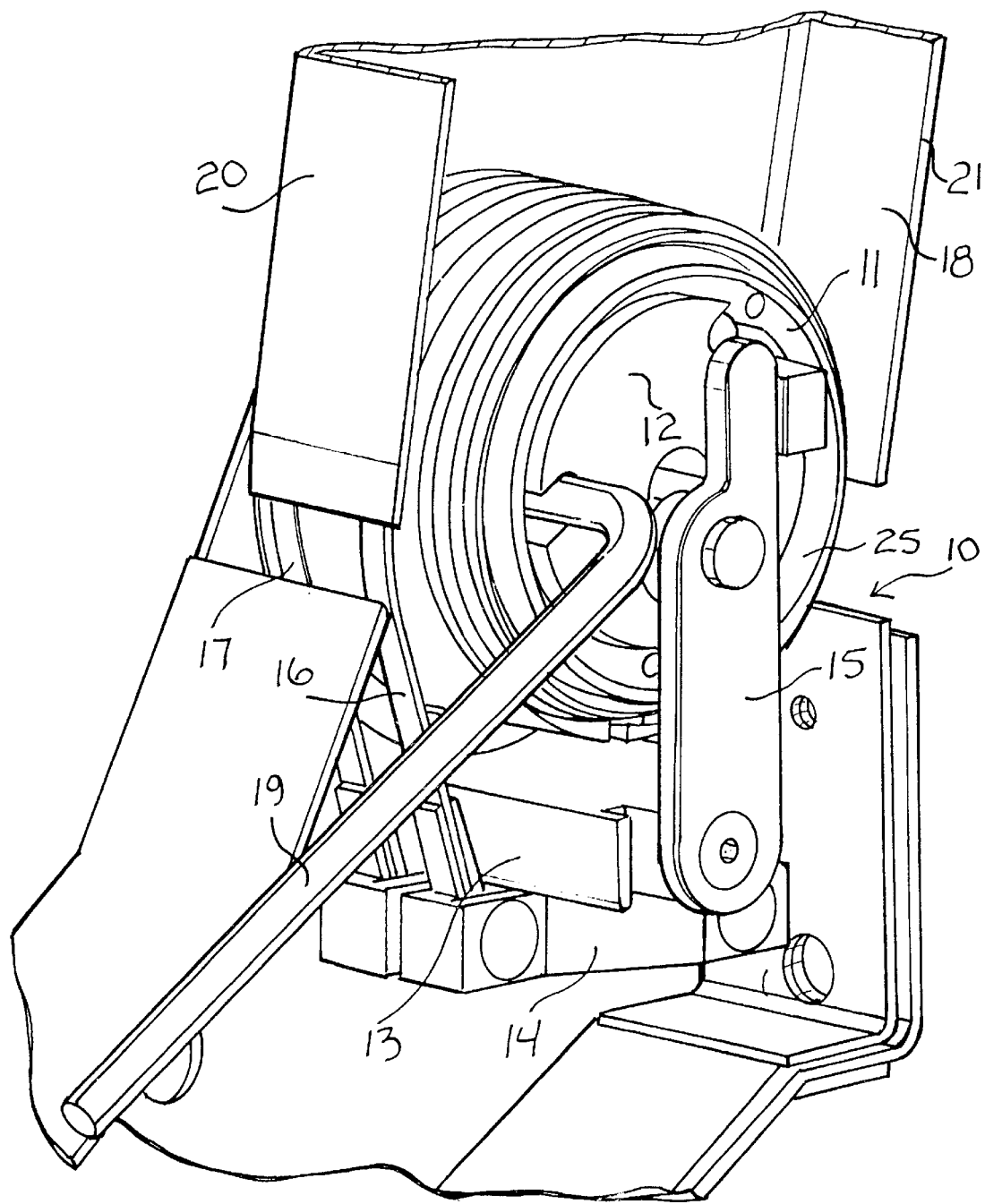
FIG. 4 is a perspective view of the self-tightening mechanism of FIG. 1 shown as it would appear in combination with a back portion.

In FIG. 4, self-tightening mechanism 10 is shown as it would appear situated in combination with a back portion 18. In normal use, the coupling of back portion 18 and self-tightening mechanism 10 occurs at drum 11. A cam lever 19 mounted to link 12 is movable between a first position for moving bands 16 and 17 into a loosened condition for allowing back portion 18 to be moved, and a second position for moving bands 16 and 17 into a tightened condition for securing back portion 18 at a fixed position. When cam lever 19 is moved upwardly, cam lever 19 rotates link 12 clockwise so that linkages 15 draw pivot block 13 toward drum 11, loosening bands 16 and 17. When lever 19 is moved into the position illustrated in FIG. 4, link 12 moves counter-clockwise and linkages 15 force pivot block 13 away from drum 11, tightening bands 16 and 17.

Referring back to FIG. 3, drum 11 includes an inner portion 25 fixed to a riser 26 of seat bottom 23. In this embodiment inner portion 25 is fixed by a series of bolts, not shown, extending through riser 26 into apertures 27 in inner portion 25. An outer portion 28 coupled to back portion 18 is received about inner portion 25. Inner portion 25 and outer portion 28 are coaxially nested so as to frictionally engage each other upon tightening of outer portion 28. Thus, when bands 16 and 17 are in the tightened condition, friction between bands 16 and 17 and outer portion 28 inhibits movement of back portion 18. Additionally, outer portion 28 is compressed about inner portion 25, producing frictional engagment between the two portions further inhibiting movement of back portion 18.

Figure 5:
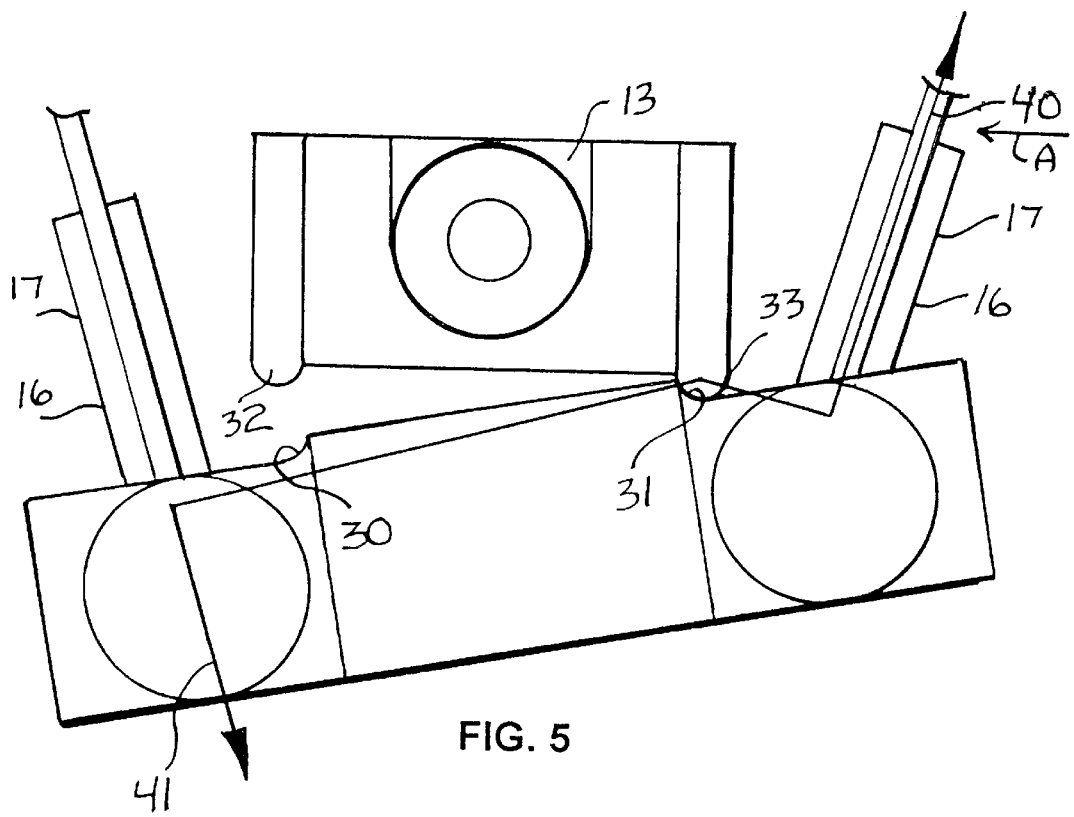
FIG. 5 is a schematic view of a lever assembly of the self-tightening mechanism of FIG. 1.
Figure 6:
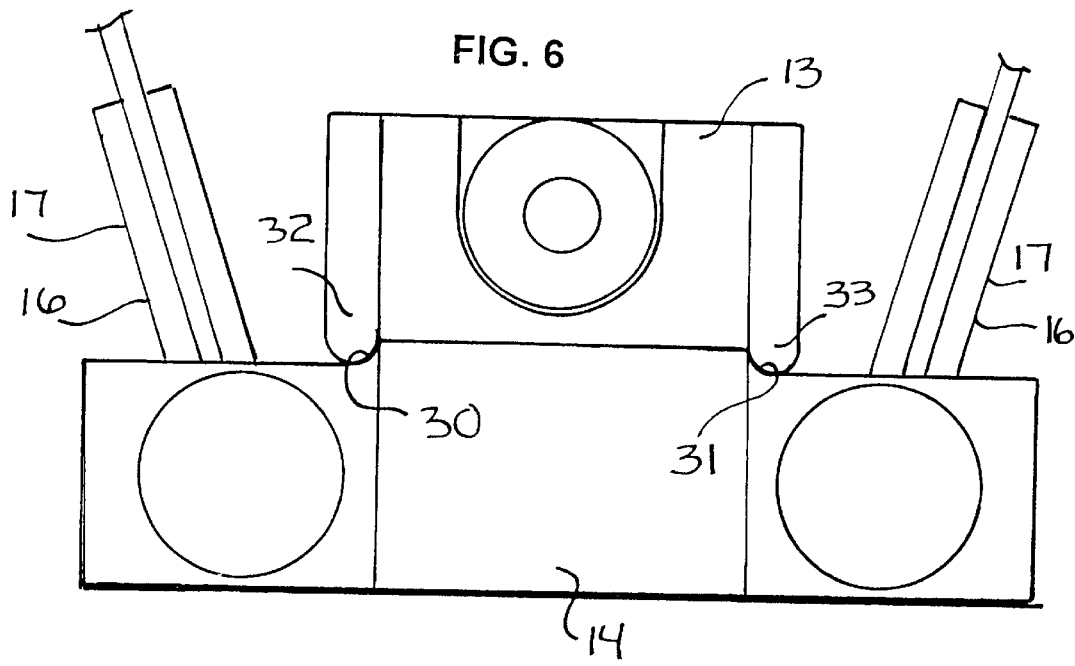
FIG. 6 is a schematic view of the lever assembly of FIG. 5 shown as it would appear in a static position.

With bands 16 and 17 in their tightened condition, back portion 18 can accommodate load from its front and back sides 20 and 21. Depending on which side of back portion 18 load is applied, a tension is always introduced into that side of bands 16 and 17 facing the load, and a loosening is always introduced into that side of bands 16 and 17 facing away from the load. Turning to FIG. 5, lever 14 is mounted to pivot and includes recesses 30 and 31 each for accommodating one of a pair of enlargements 32 and 33 supported by pivot block 13. When load is applied in the direction indicated by the arrowed line A in FIG. 5, which could be load applied either to the front or back side of a back portion, tensioned and loosened sides 40 and 41 are introduced into the bands 16 and 17. As tensioned side 40 increases, it pivots lever 14 up slightly at tensioned side 40. As lever 14 pivots up slightly, it moves down at loosened side 41 which introduces a force or tension into loosened side 41. This is a self-tightening of bands 16 and 17 which substantially inhibits back portion 18 from giving to the load by keeping a tension on loosened side 41. The amount of force applied to loosened side 41 is directly proportional to the distance traveled on tensioned side 40. The ratio of tensioned side 40 to loosened side 41 determines the slip torque. In an exemplary application, lever arm L1 is four times the length of lever arm L2 establishing an approximate ratio of 4:1, although other ratios can be used successfully. In the absence of a load to back portion 18, pivot block 13 and lever 14 define a static position as shown in FIG. 6 with enlargements 32 and 33 each mating with one of recesses 30 and 31.

In a simplified description of the operation of self tightening recliner mechanism 10, bands 16 and 17 prevent pivotal movement of back portion 18 in the tightened position unless a specific load has been reached or exceeded. If the load is reached, it is desirable that clutching or slipping of the bands occur. When a load is applied to back portion 18 in a forward direction, as indicated by arrowed line A, such as would occur on a seat back of an automobile during a front end collision, the ends of bands 16 and 17 tend to loosen at side 41 and the ends of bands 16 and 17 tend to tighten at side 40. If this is allowed to occur uncontrolled, portion 28 of drum 11 will slip and back portion 18 will be allowed to pivot at less than the desired load. To control this action, lever 14 is employed. When the ends at side 40 tighten, lever 14 pivots about enlargement 33 of pivot block 13 maintaining tension on the ends at side 41. Drum 11 is designed to clutch (slip) at a predetermined load applied to back portion 18. This is desirable as it will absorb much of the energy of an impact. The amount of load required to cause clutching is determined by the amount of tension applied to the ends of bands 16 and 17. The amount of tension is determined by the pivot distance of lever 14.

Figure 7:
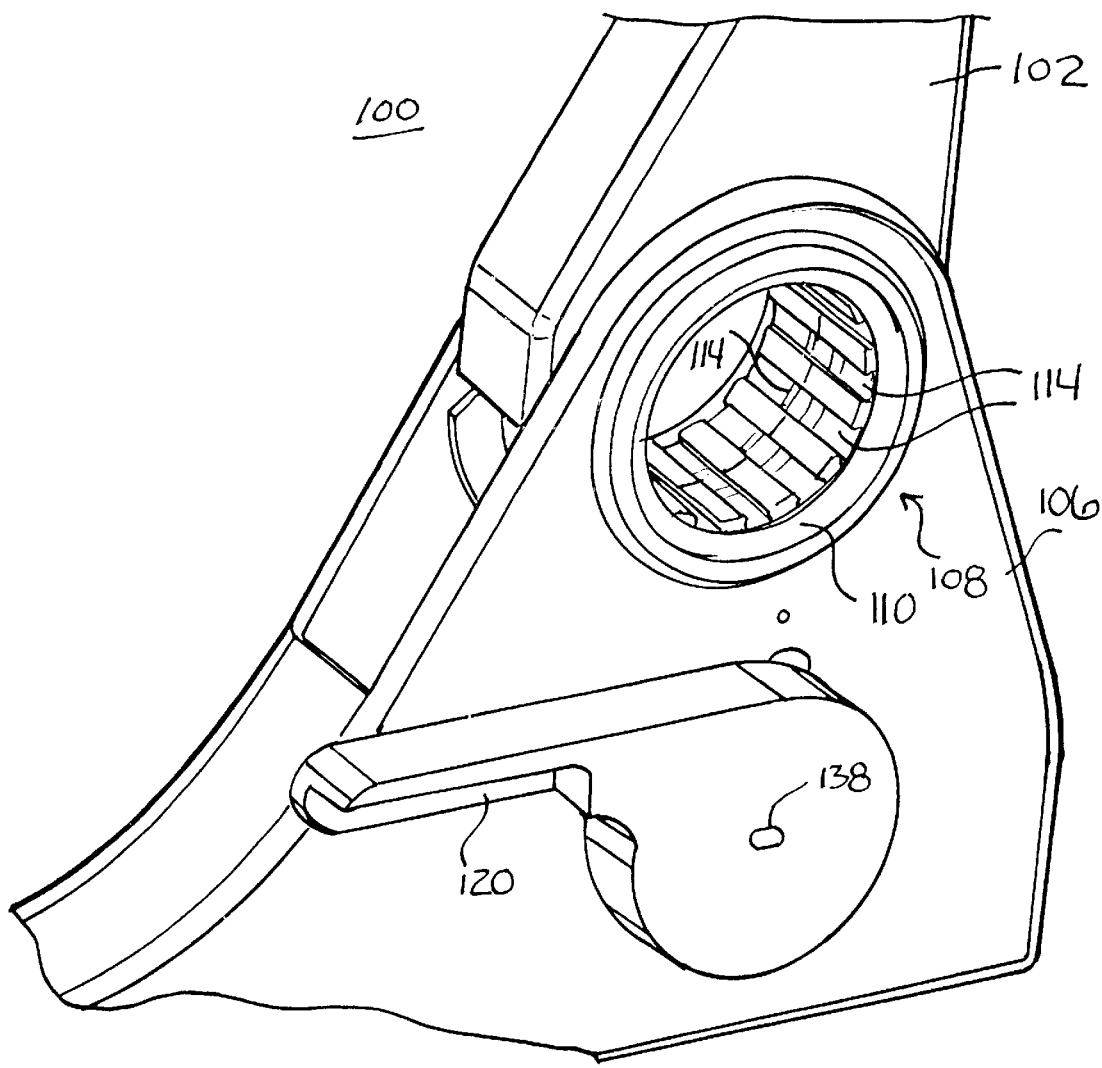
FIG. 7 is a perspective view of another embodiment of a seat frame incorporating a self tightening mechanism in accordance with the present invention.

Turning now to FIG. 7, a self-tightening recliner mechanism 100 is illustrated. Mechanism 100 includes a back portion 102 and a bottom portion 104. Back portion 102 is a portion of a seat back of a vehicle. Bottom portion 104 is a portion of a seat frame containing a track as has been discussed previously and includes a riser 106. Riser 106 is formed as bifercated sides to receive back portion 103 pivotally therebetween. A drum 108 pivotally coupled back portion 103 to riser 106. Drum 108 includes an inner portion 110 and an outer portion 112. In this embodiment, an opening is formed in each side of riser 106, with inwardly directed fingers 114 extending from the periphery thereof. Inner portion 110 has axially extending grooves 116 (see FIG. 8) formed around the periphery of in an inner surface thereof to receive fingers 114. Fingers 114 fitting within grooves 116 hold inner portion 110 fixed in relation to riser 106. While inner portion 110 is illustrated as a separate element in this embodiment, it will be understood that inner portion 110 can be an integral portion of riser 106 similar to the previous embodiment. A handle 120 permits adjustment of self-tightening mechanism 100 as will be described below.

Figure 8:
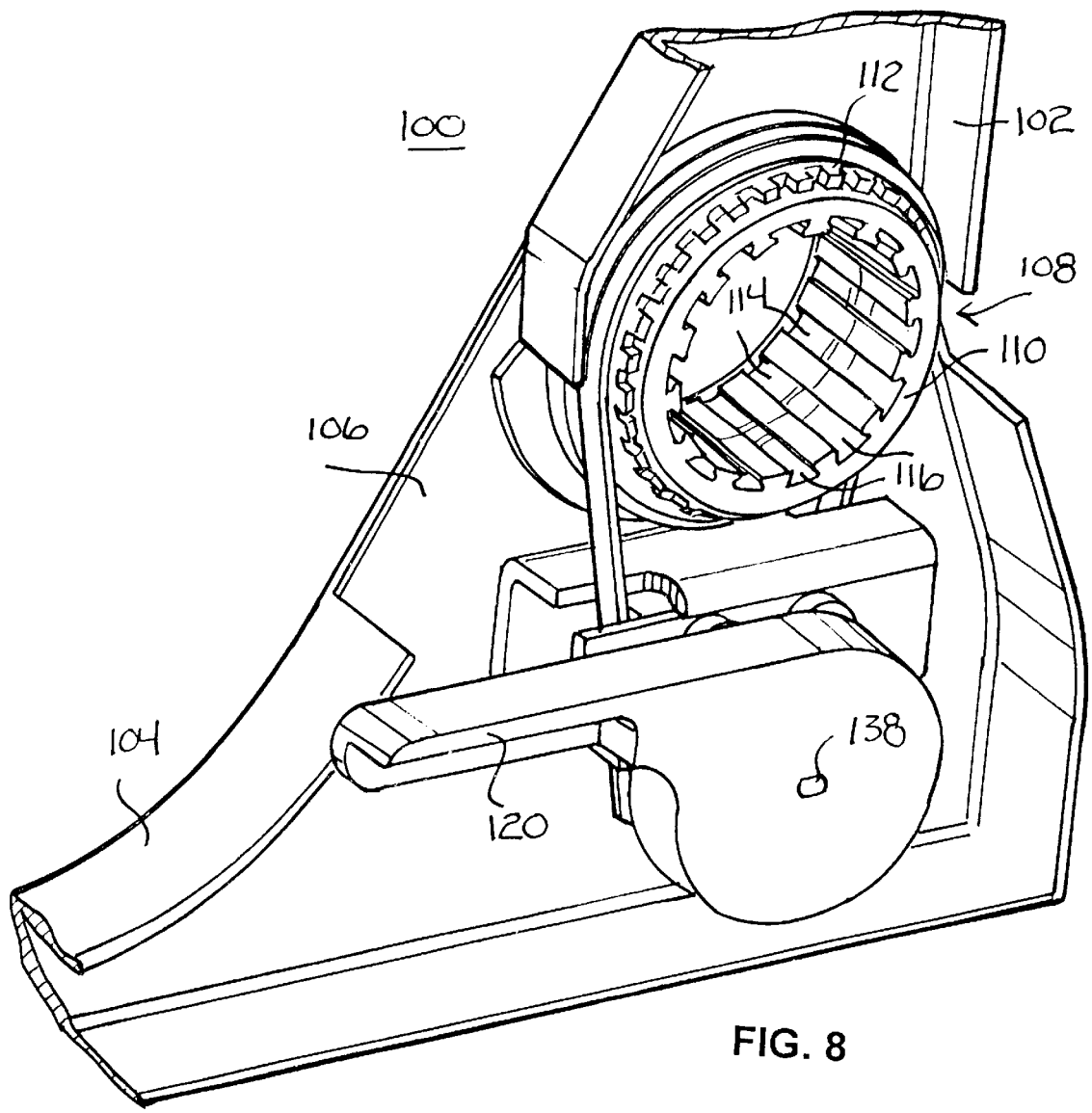
FIG. 8 is a perspective view of the self tightening mechanism of FIG. 7, portions thereof removed.
Figure 9:
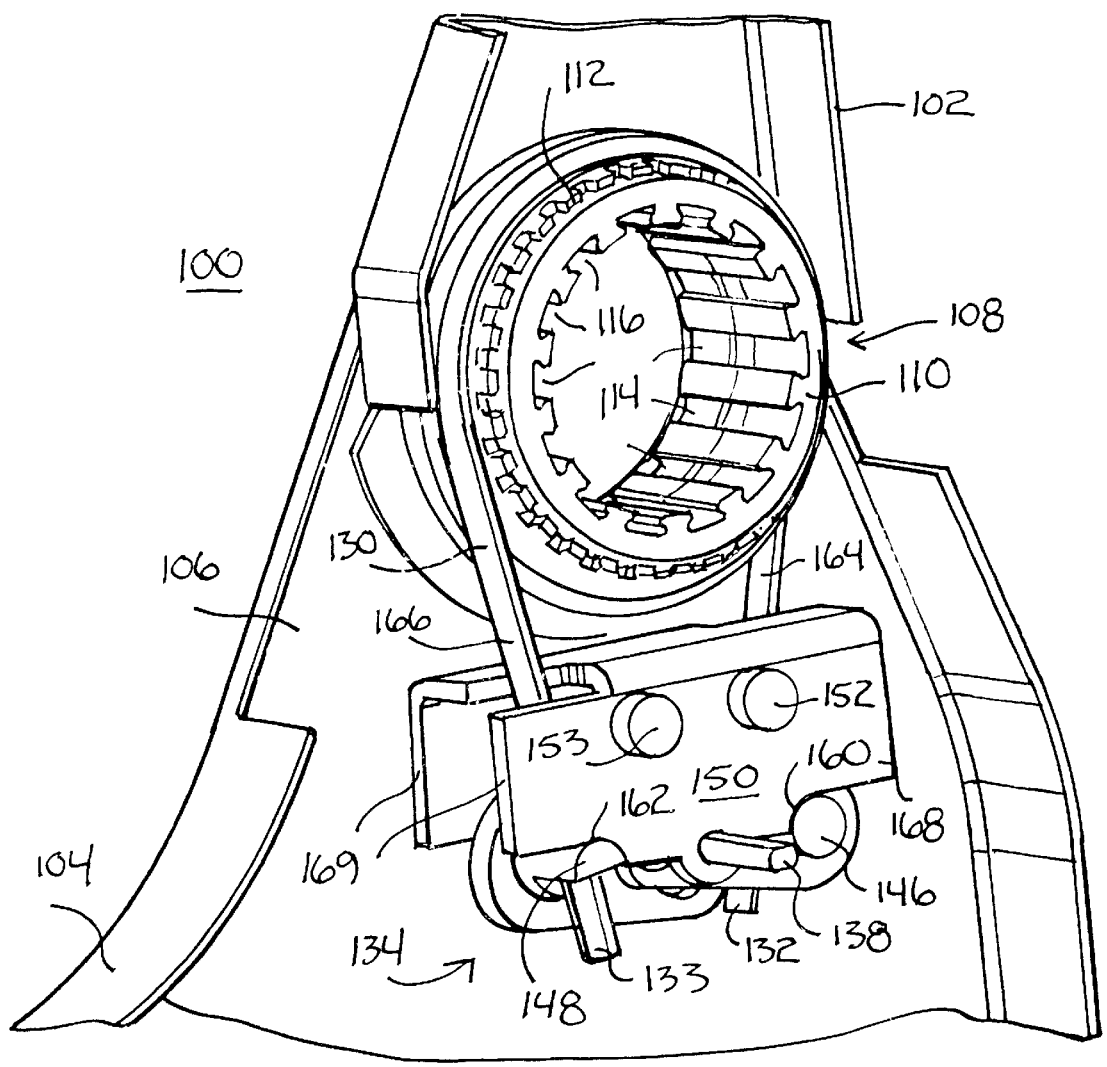
FIG. 9 is a perspective view of the self tightening mechanism of FIG. 8, portions thereof removed.

Turning now to FIG. 8, one side of riser 106 has been removed to illustrate the inner elements of the mechanism. Referring also to FIG. 9, handle 120 has been removed to further illustrate the inner elements. Outer portion 112 of drum 108 is carried coaxially about inner portion 110 for relative rotation therebetween. Outer portion 112 includes a plurality of peripheral notches 122 at each edge which receives tabs (not visible) extending from back portion 102. The tabs extend axially inwardly from each side of back portion 102 corresponding to notches 122. Outer portion 112 is preferrably formed of a resilient material (e.g. steel) and includes a gap 124 (see FIG. 10). Outer portion 112 can be compressed to reduce its inner diameter, frictionally engaging inner portion 110, and released to expand its inner diameter, reducing the friction. To further increase the friction of the engagement between inner portion 110 and outer portion 112, splines, or roughening can be formed in the inner surface of outer portion 112.

The compression of outer portion 112 is accomplished by a band 130 having opposing ends 132 and 133. Band 130 is wrapped about outer portion 112, thereby including inner portion 110. In this embodiment, band 130 is a coiled rod formed of spring steel, but it should be understood that other materials can be employed. Ends 132 and 133 are coupled to a linkage mechanism 134 which moves ends 132 and 133 between a normal position and an expanded position. In the normal position the inner diameter of band 130 is at a reduced diameter or tightened condition, tightly engaging outer portion 112 and compressing it to engage inner portion 110. Upon actuation of linkage mechanism 134, ends 132 and 133 are forced apart, resulting in an increase in the inner diameter of band 130 or loosened condition. The increased inner diameter reduces the frictional engagment with outer portion 112. One skilled in the art will recognize that while ends 132 and 133 are forced apart to increase the inner diameter of band 130 in this embodiment, band can be reconfigured so that the loosened condition and tightened condition are reversed.

In this manner, back portion 102 can be adjusted by moving band 130 into the loosened condition, reducing friction between band 130 and outer portion 112, and also allowing outer portion 112 to expand, reducing the friction between outer portion 112 and inner portion 110. In the tightened condition, the frictional engagment between band 130 and outer portion 112 inhibits rotation of outer portion 112. Furthermore, outer portion 112 is compressed increasing the frictional engagement between outer portion 112 and inner portion 110.

Figure 10:
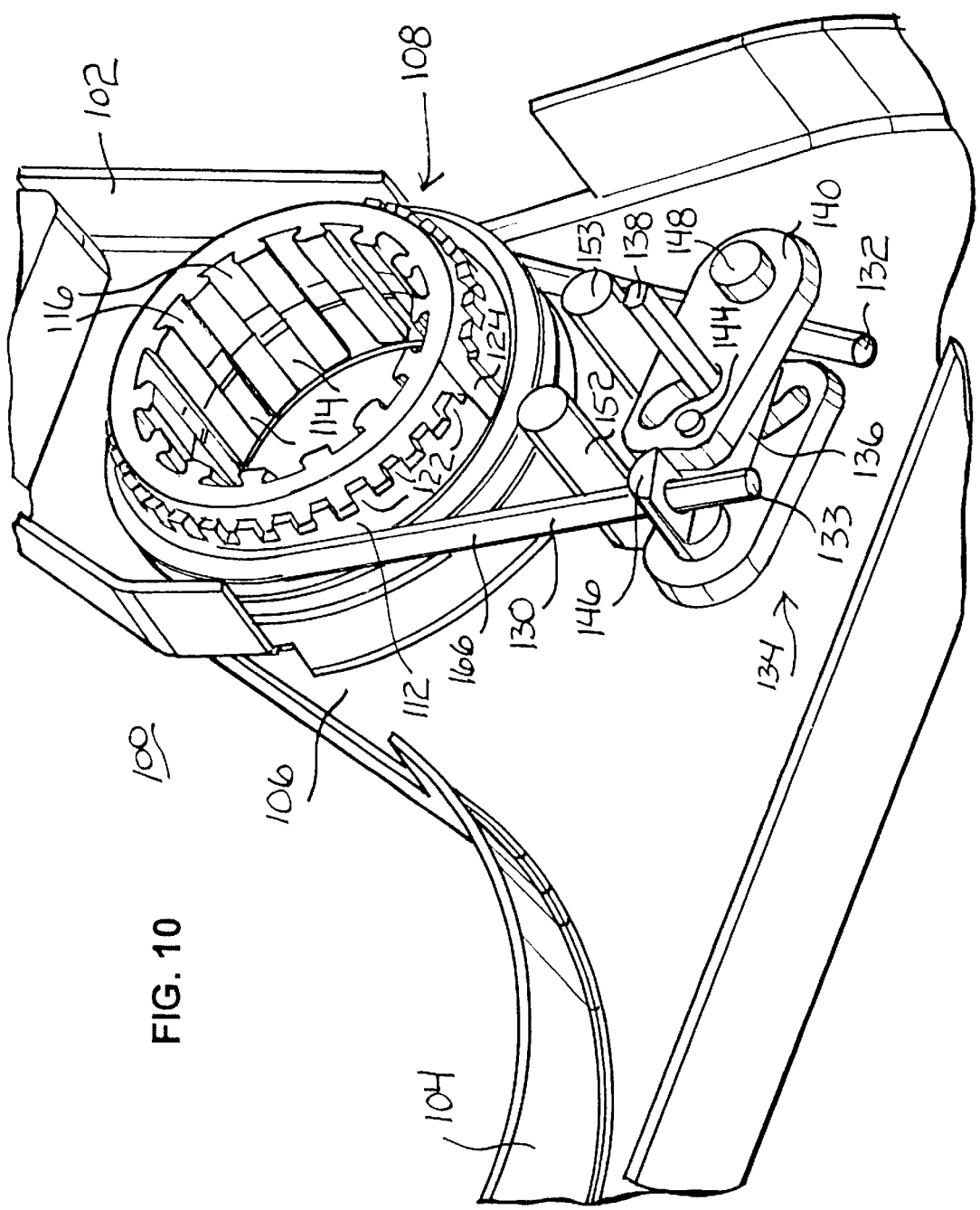
FIG. 10 is a perspective view of the self tightening mechanism of FIG. 9, portions thereof removed.

Referring to FIG. 10 linkage mechanism 134 includes a driving link 136 rotated by a handle pin 138 upon which handle 120 is mounted. Drive link 136 is positiond between a link 140 and a link 142. Drive link 136 is pivotally coupled to first link 140 by pivot pin 144 and is pivotally coupled to second link 142 by pivot pin (not visible). As handle 120 is lifted, handle pin 138 rotates clockwise rotating drive link 136 clockwise and forcing link 140 to the right in FIG. 10 and link 142 to the left. When handle 120 is moved to the normal or depressed position, the linkage is overcentered, holding it the normal position. End 132 of band 130 is pivotally coupled to link 140 by a pivot pin 146 and end 133 of band 130 is pivotally coupled to link 142 by a pivot pin 148. Thus, by movign handle 120, band 130 can moved between the loosened condition for adjusting back portion 102, and the tightened condition inhibiting movement of back portion 102.

Referring back to FIG. 9, the self-tightening feature of mechanism 10 is provided by a lever 150 which has a generally U-shaped cross section so as to encompass linkage mechanism 134. A pair of spaced apart guide pins 152 and 153 each projecting outwardly form opposite sides of lever 150. Pins 152 and 153 extend through generally V-shaped slots 154 formed in both sides of riser 106. Pins 152 and 153 are spaced apart to extend through opposing arms 156 and 157 of slots 154. Since arms 156 and 157 slope toward each other at the bottom and pins 152 and 153 are a fixed distance apart, when lever 150 is horizontal pins 152 and 153 are each proximate the tops of arms 156 and 157, respectively. Thus, as will be understood presently, slots 154 and riser 106 act as a pivot block for lever 150.

Figure 11:
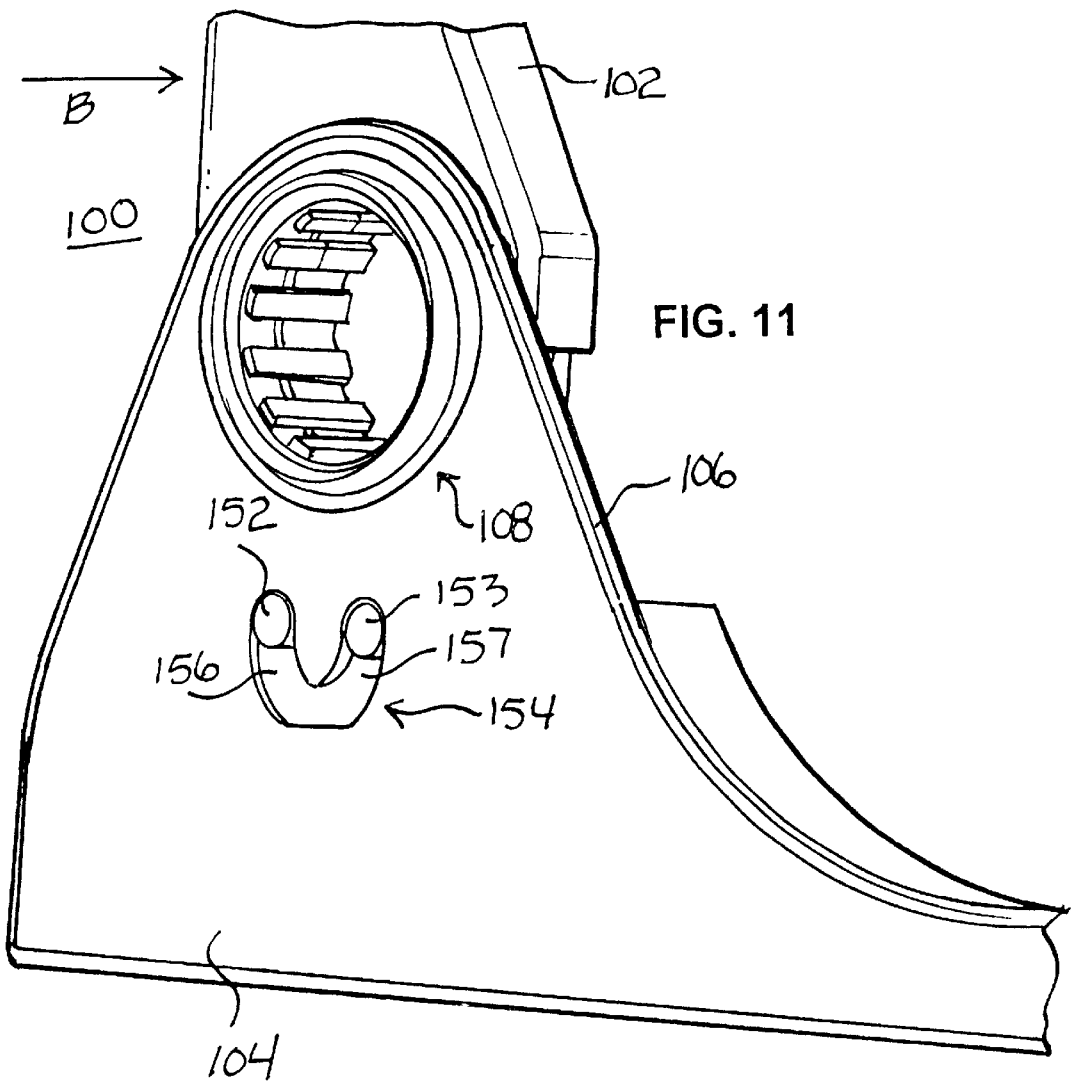
FIG. 11 is a reversed perspective view of FIG. 9.

Lever 150 includes a pair of recesses 160. and 162 bearing against pivot pins 146 and 148, respectively, in the static position. The static position is illustrated in FIG. 11, wherein guide pins can be seen to reside proximate the upper portions of each arm 156 and 157. No pivoting occurs in lever 150, and pivot pins 152 and 153 bear against recesses 160 and 162 respectively (see FIG. 9).

Figure 12:
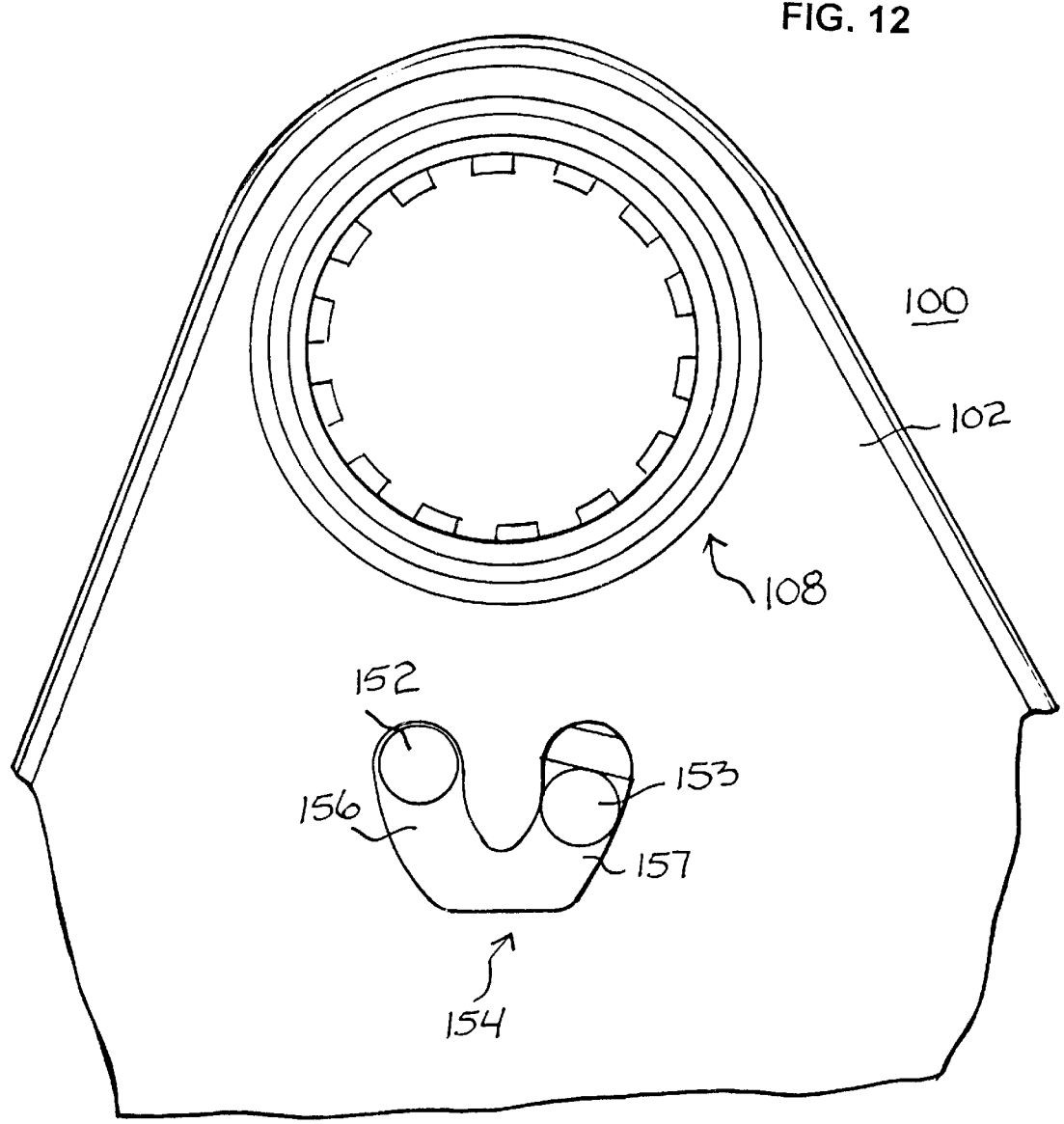
FIG. 12 is an enlarged perspective view of FIG. 11, as it would appear with a load applied.

With band 130 in its tightened condition, back portion 102 can accommodate load from its front and back sides. Depending on which side of back portion 102 load is applied, a tension is always introduced into that side of band 130 facing the load, and a loosening is always introduced into that side of band 130 facing away from the load. Lever 150 is mounted to pivot, guided by guide pins 152 and 153 riding in arms 156 and 157 of slots 154, respectively. When load is applied in the direction indicated by arrowed line B in FIG. 11, which could be load applied either to the front or back side of a back portion, tension and slack are introduced into side 164 adjacent end 132 and side 166 adjacent end 133 of band 130, respectively. As tension in side 164 increases, pivot pin 146 bears against recess 160 pivoting an end 168 of lever 150 upwardly about guide pin 152. An opposing end 169 is correspondingly lowered, removing the slack from side 166. Guide pin 152 becomes the pivot point of lever 150 because it is at the highest point of arm 156 and is held stationary, while guide pin 153 moves downwardly in arm 157 as shown in FIG. 12. As lever 150 pivots slightly, end 169 moves down at loosened side 166 which introduces a force or tension into loosened side 166. This is a self-tightening of band 130 which substantially inhibits back portion 102 from giving to the load by keeping a tension on loosened side 166. The amount of force applied to loosened side 166 is directly proportional to the distance traveled on tensioned side 164. The ratio of tensioned side 164 to loosened side 166 determines the slip torque. In an exemplary application, an approximate ratio of 4:1 is provided, although other ratios can be used successfully. In the absence of a load to back portion 102, pivot block, i.e. riser 106 and slot 154, and lever 150 define a static position as shown in FIGS. 9 and 11 with pivot pins 146 and 148 each bearing within on e of recesses 160 and 162.

In a simplified description of the operation of self tightening recliner mechanism 100, band 130 prevents pivotal movement of back portion 102 in the tightened condition unless a specific load has been reached or exceeded. If the load is reached, it is desirable that clutching or slipping of the band occurs. When a load is applied to back portion 102 in a forward direction, such as would occur on a seat back of an automobile during a front end collision, the ends of band 130 tend to loosen at side 166 and the end of band 130 tend to tighten at side 164. If this is allowed to occur uncontrolled, outer portion 112 of drum 108 will slip and back portion 102 will be allowed to pivot at less than the desired load. To control this action, lever 150 is employed. When end 132 at side 164 tightens, lever 150 pivots about guide pin 152 held stationary by riser 106, maintaining tension on end 133 at side 166. Drum 108 is designed to clutch (slip) at a predetermined load applied to back portion 102. This is desirable as it will absorb much of the energy of an impact. The amount of load required to cause clutching is determined by the amount of tension applied to end 133 of band 130. The amount of tension is determined by the pivot distance of lever 150.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A self-tightening mechanism comprising:
   a back portion;
   a drum coupled to the back portion;
   a band having a first end and a second end, the band wrapped about the drum inhibiting rotation thereof;
   a tightening mechanism coupled to the first end and the second end such that a force applied to the back portion in either of two opposing directions produces a tension in the band adjacent either one of the first end and the second end and a corresponding loosening of the band adjacent the other of the first end and the second end, the tightening mechanism including a lever pivotable about a fixed pivot point to convert a portion of the tension to reduce the loosening.

2. A self-tightening mechanism as claimed in claim 1 wherein the fixed pivot point includes a first pivot point and a second pivot point spaced from the first pivot point, each of the first pivot point and the second pivot point defining a ratio, the ratio determining the portion of the tension converted to reduce the loosening, the lever pivoting about the first pivot point with the force in a first of the opposing direction and the lever pivoting about the second pivot point with the force in a second of the opposing directions.

3. A self-tightening mechanism as claimed in claim 2 further including a pivot block defining the first pivot point and the second pivot point.

4. A self-tightening mechanism as claimed in claim 3 wherein the lever bears against the pivot block at the first pivot point and the second pivot point in a static position.

5. A self-tightening mechanism as claimed in claim 4 wherein the first end and the second end of the band are coupled to opposing ends of the lever, respectively.

6. A self-tightening mechanism as claimed in claim 2 wherein the tightening mechanism is constructed to clutch at a load determined substantially by the ratio.

7. A self-tightening reclining seat mechanism comprising:
- a seat back portion;
- a base element;
- a drum having a first portion coupled to the seat back portion and a second portion coupled to the base element, the first portion and the second portion nested for relative coaxial rotation;
- a band having a first end and a second end, the band wrapped about the drum and movable between a tightened condition inhibiting relative rotation of the first and second portion of the drum and a loosened condition permitting relative rotation of the first and second portion of the drum;
- a linkage mechanism for moving the band between the tightened condition and the loosened condition;
- a tightening mechanism coupled to the first end and the second end of the band such that a force applied to the seat back portion in either of two opposing directions produces a tension in the band adjacent either one of the first end and the second end and a corresponding loosening of the band adjacent the other of the first end and the second end, the tightening mechanism including a lever pivotable about a fixed pivot point to convert a portion of the tension to reduce the loosening.

8. A self-tightening reclining seat mechanism as claimed in claim 7 wherein the fixed pivot point includes a first pivot point and a second pivot point spaced from the first pivot point, each of the first pivot point and the second pivot point defining a ratio, the ratio determining the portion of the tension converted to reduce the loosening, the lever pivoting about the first pivot point with the force in a first of the opposing direction and the lever pivoting about the second pivot point with the force in a second of the opposing directions.

9. A self-tightening reclining seat mechanism as claimed in claim 8 further including a pivot block defining the first pivot point and the second pivot point.

10. A self-tightening reclining seat mechanism as claimed in claim 9 wherein the lever bears against the pivot block at the first pivot point and the second pivot point in a static position.

11. A self-tightening reclining seat mechanism as claimed in claim 10 wherein the first end and the second end of the band are coupled to opposing ends of the lever, respectively.

12. A self-tightening reclining seat mechanism as claimed in claim 8 wherein the tightening mechanism is constructed to clutch at a load determined substantially by the ratio.

13. A self-tightening reclining seat mechanism as claimed in claim 7 wherein the band includes a coiled rod with the first end and the second end being positioned so that one of a separating movement and a compressing movement moves the band between the tightened condition and the loosened condition.

14. A self-tightening reclining seat mechanism as claimed in claim 13 wherein the separating movement of the first end and the second end achieves the loosened condition.

\* \* \* \* \*